United States Patent
Jang

(10) Patent No.: US 6,665,196 B2
(45) Date of Patent: Dec. 16, 2003

(54) SHIELDING COVER FOR TERMINAL DEVICE OF ELECTRIC APPLIANCE AND COMPRESSOR ASSEMBLY HAVING THE SAME

(75) Inventor: Kwang-Woo Jang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 72 days.

(21) Appl. No.: 09/778,743

(22) Filed: Feb. 8, 2001

(65) Prior Publication Data

US 2002/0075665 A1 Jun. 20, 2002

(30) Foreign Application Priority Data

Dec. 7, 2000 (KR) .......................................... 2000-74325

(51) Int. Cl.7 .................................................. H02K 9/00
(52) U.S. Cl. ........................ 361/816; 361/753; 361/818
(58) Field of Search ................................. 361/752–753, 361/816, 818, 800, 819, 831, 22–26; 337/380, 198–200; 439/521, 892; 174/138

(56) References Cited

U.S. PATENT DOCUMENTS

| | | | | |
|---|---|---|---|---|
| 4,523,798 A | * | 6/1985 | Barrows et al. | 339/192 RL |
| 4,840,547 A | * | 6/1989 | Fry | 417/422 |
| 5,129,843 A | * | 7/1992 | Bowsky et al. | 439/685 |
| 5,515,217 A | | 5/1996 | Higashikata et al. | |
| 5,664,959 A | * | 9/1997 | Duell et al. | 439/287 |
| 5,942,967 A | * | 8/1999 | Grimes | 337/380 |

* cited by examiner

*Primary Examiner*—David L. Talbott
*Assistant Examiner*—Tuan Dinh
(74) *Attorney, Agent, or Firm*—Robert E. Bushnell, Esq.

(57) ABSTRACT

A shielding cover for a terminal device of an electric appliance and a compressor assembly includes first and second receiving parts which can receive selectively two or more terminal devices (overload protectors) formed in different shapes are integrally formed at the shielding cover. Accordingly, since the shielding cover can be used in common regardless of the shapes of the terminal devices, the whole manufacturing cost of an electric appliance such as a compressor assembly can be reduced.

9 Claims, 5 Drawing Sheets

SHIELDING COVER FOR TERMINAL DEVICE OF ELECTRIC APPLIANCE AND COMPRESSOR ASSEMBLY HAVING THE SAME

CLAIM OF PRIORITY

This application makes reference to, incorporates the same herein, and claims all benefits accruing under 35 U.S.C. §119 from an application entitled TERMINAL APPARATUS PROTECTING COVER FOR ELECTRIC MANUFACTURED GOODS AND COMPRESSOR ASSEMBLY WITH PROTECTING COVER earlier filed in the Korean Industrial Property Office on the 7$^{th}$ day of Dec. 2000, and there duly assigned Serial No. 74325/2000.

BACKGROUND OF THE INVENTION

1. Field of the Invention

The present invention relates to a shielding cover for a terminal device of an electric appliance and a compressor assembly having the same. More specially, the present invention relates to a shielding cover for a terminal device of an electric appliance and a compressor assembly having the same which covers a terminal device such as an overload protector for protecting a compressor from an overload by controlling an input power.

2. Description of the Related Art

In general, since an electric appliance is operated by being supplied with an input power, a terminal device such as an overload protector which protects an appliance from an overload by controlling an input power is separately required, the terminal device being protected by a shielding cover.

By way of example of an appliance requiring such an overload protector, a compressor having a conventional shielding cover will be described herein.

A conventional compressor assembly includes an airtight container in which a driving motor and a compressing device are mounted, and an accumulator which guides an evaporated refrigerant into the airtight container. The accumulator which is formed as a cylindrical casing communicates with the airtight container via a refrigerant guiding pipe, and is mounted upright outside the airtight container by means of a holder.

On an outer surface of the airtight container, a power input terminal which is directly connected to the driving motor and an overload protector which protects the driving motor from the overload are disposed. And, the power input terminal and the overload protector are protected by a shielding cover. The overload protector is generally formed in a cylindrical shape. Also, the shielding cover has generally two covering parts, one of which shields the power input terminal and the other of which shields tightly the overload protector. Such a shielding cover is fixed by a stud bolt which is mounted upright to the outer surface of the airtight container, and the overload protector is concomitantly secured.

However, since the conventional shielding cover of the compressor assembly is formed to shield only a cylindrical overload protector, it can not be applied to any compressor assemblies having overload protectors formed in other shapes.

Especially, a rectangle-type overload protector is recently on the market more than a circle-type overload protector, because the rectangle-type protector is cheaper than the circle-type. Accordingly, when the rectangle-type overload protector is mounted to the compressor assembly, a shielding cover which can shield tightly the rectangle-type overload protector should be manufactured additionally, thereby the overall manufacturing cost of the compressor assembly being increased.

SUMMARY OF THE INVENTION

The present invention has been made in an effort to solve the above problems.

It is an object of the present invention to provide a shielding cover for a terminal device of an electric appliance and a compressor assembly having the same which can shield selectively two or more terminal devices (overload protectors) formed in different shapes and can be used in common.

In order to achieve the above object, the present invention provides a shielding cover for a terminal device of an electric appliance for protecting the terminal device, which is provided with plural receiving parts which can receive selectively two or more terminal devices formed in different shapes.

The present invention also provides a compressor assembly having a shielding cover for protecting an overload protector which is mounted outside an airtight container of a compressor and protects the compressor from an overload, in which plural receiving parts which can receive selectively two or more overload protectors formed in different shapes are provided at the shielding cover.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

In the present invention, by way of example of an electric appliance requiring a shielding cover for a terminal device, a rotary compressor assembly having a shielding cover will be described herein.

Figure 1:
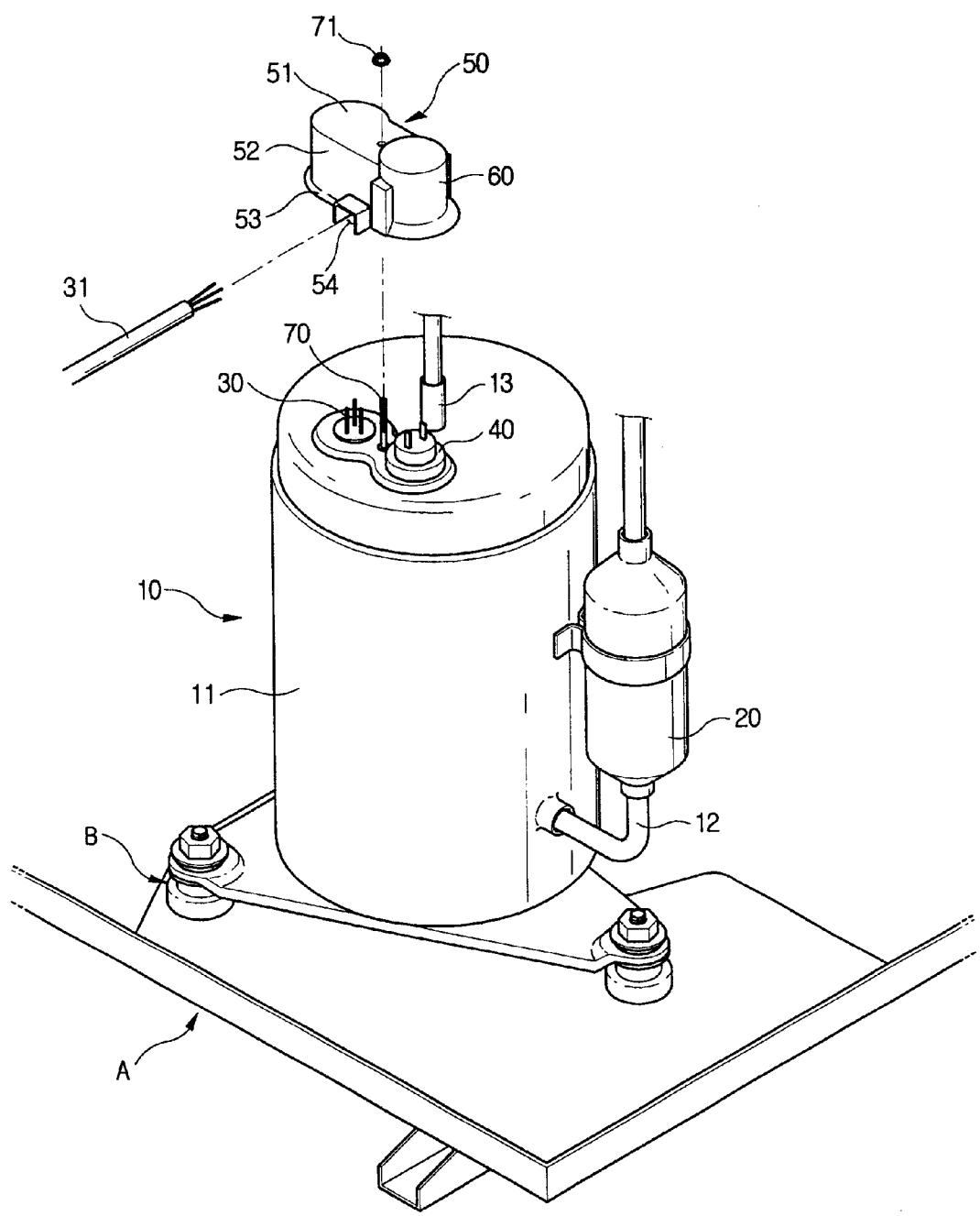
FIG. 1 is a perspective view showing a rotary compressor assembly according to a preferred embodiment of the present invention.

As shown in FIG. 1, a rotary compressor assembly, to which the present invention is applied, includes a rotary compressor 10 which is fixedly supported on a base plate A of an air conditioner, etc. by means of vibroisolating members B, and an accumulator 20 which is mounted upright to an outer side surface of the rotary compressor 10.

The rotary compressor 10 includes a cylindrical airtight container 11 which has a refrigerant suction pipe 12 and a discharge pipe 13 for guiding the inflow and exhaust of the refrigerant respectively, a driving motor (not shown) which is disposed inside the airtight container 11 and generates a driving force by being supplied with a power via a power input terminal 30 (which will be described later), and a compressing device (not shown) which is supplied with the driving force of the motor, so as to suck, compress and discharge the refrigerant. At this time, the refrigerant flows in the airtight container 11 through the suction pipe 12 which is connected to a lower side surface of the container 11, and the refrigerant is exhausted through the discharge pipe 13 which is connected to a central portion of an outer upper surface of the container 11.

On the outer upper surface of the airtight container 11, a power input terminal 30 for being supplied with an external power, an overload protector 40 which is electrically connected to the power input terminal 30 and protects the compressor from the overload, and a shielding cover 50 for protecting the power input terminal 30 and the overload protector 40 are mounted. Reference numeral 31 is a power supply wire which is directly connected to the power input terminal 30 that is electrically connected to the overload protector 40, and through which the external power is applied.

The overload protector 40 is to control the operation of the compressor 10, i.e. the driving motor, when the motor is overloaded and an electric current value is large, the overload protector 40 being disposed adjacent to the power input terminal 30.

Figure 2:
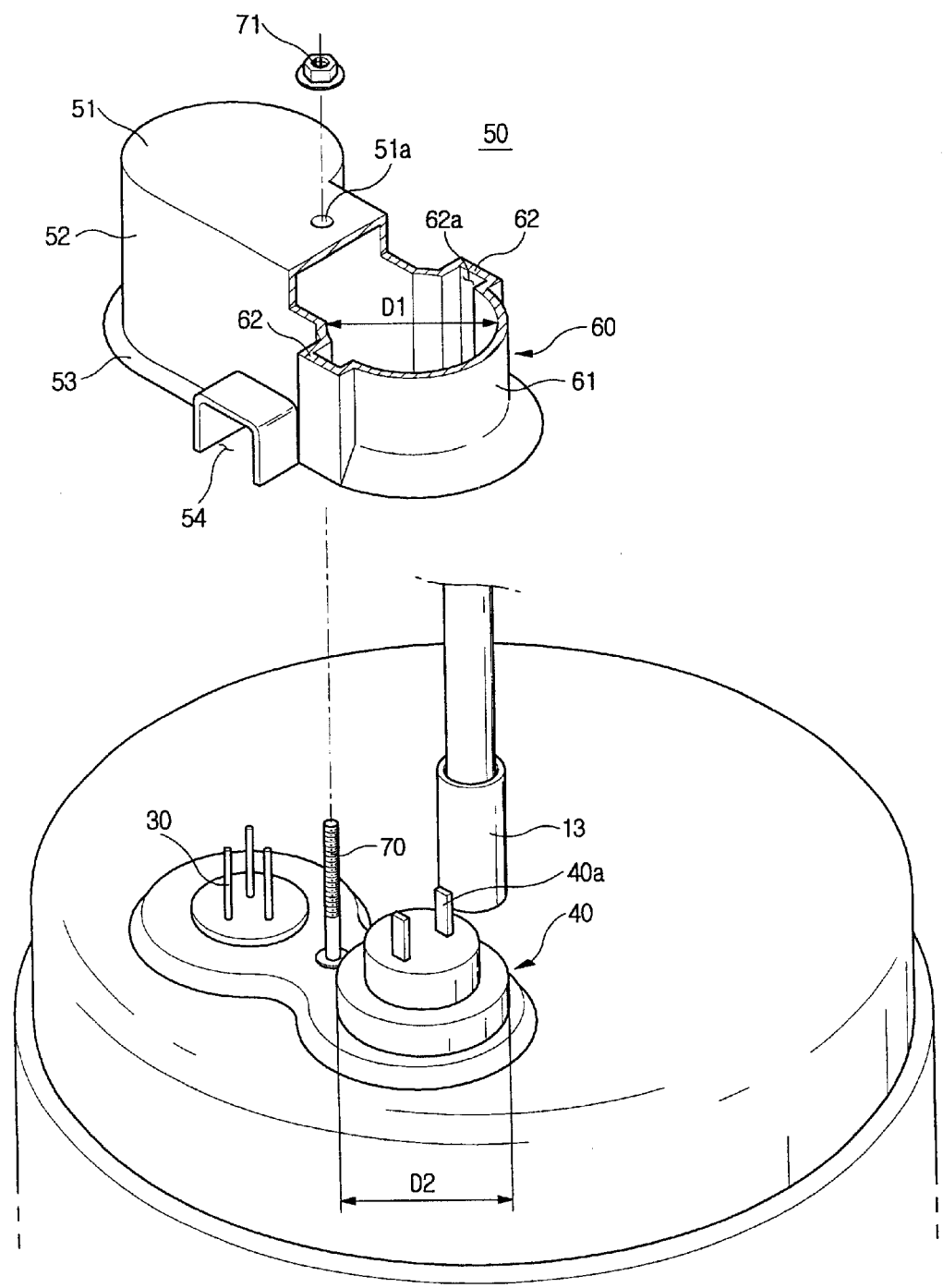
FIG. 2 is an enlarged exploded-perspective view showing a circle-type overload protector and a shielding cover of a compressor assembly according to a preferred embodiment of the present invention.
Figure 4:
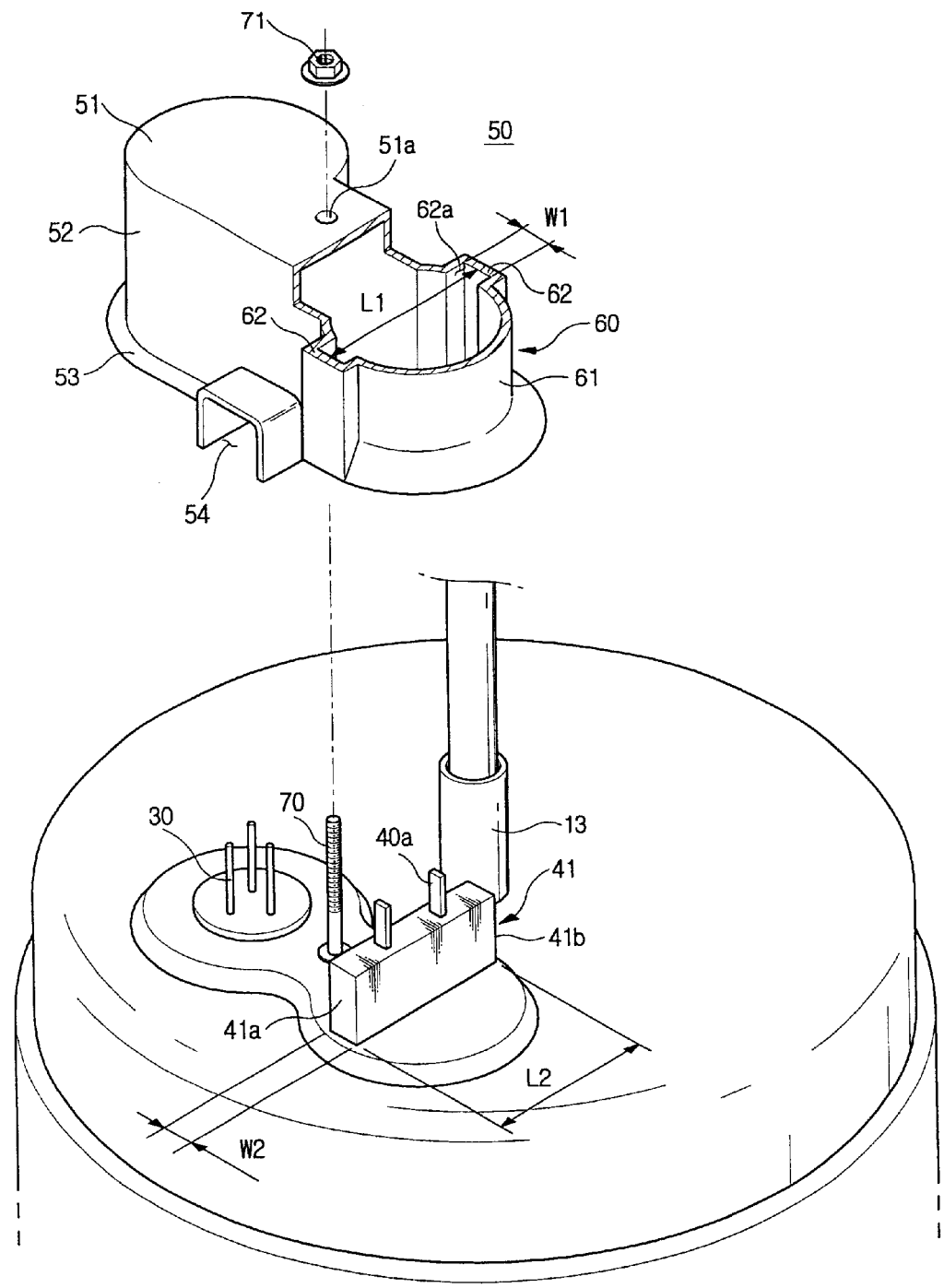
FIG. 4 is an enlarged exploded-perspective view showing a rectangle-type overload protector and a shielding cover of a compressor assembly according to another preferred embodiment of the present invention.

Referring to FIGS. 2 and 4, the overload protectors 40 and 41 are generally formed in a circle-type 40 and a rectangle-type 41, the overload protectors 40 and 41 including terminals 40a which are protruded upward to be electrically connected to the power input terminal 30. According to its shape, the circle-type overload protector 40 (see FIG. 2) is called a ¾ inch protector, and the rectangle-type overload protector 41 (see FIG. 4) is called a 4TM protector.

The shielding cover 50 shields the power input terminal 30 and the overload protector 40 (or 41) together to protect them from foreign materials like moisture, and is detachably fixed by a stud bolt 70. The shielding cover 50 includes an upper surface 51 which is formed with a through-hole 51 a at its central portion, a skirt portion 52 which is extended downward along a verge of the upper surface 51 and receives sufficiently the power input terminal 30 and the overload protector 40 (or 41), and a contacting portion 53 which is extended like a flange-shape along a lower end of the skirt portion 52 and contacts closely with the upper surface of the airtight container 11. The skirt portion 52 is formed with a drawing hole 54 through which the power supply wire 31 is drawn out, and the stud bolt 70 is disposed between the power input terminal 30 and the overload protector 40 (or 41).

Also, a receiving part 60, which can receive selectively two or more overload protectors 40 and 41 formed in different shapes and fix securely the protectors 40 and 41 regardless of the shapes thereof, is formed at a portion of the shielding cover 50. The detailed structure of the receiving part 60 will be now described hereinafter with reference to FIGS. 2 and 4.

As aforementioned, the overload protectors 40 and 41 are generally formed in a circle-type 40 and a rectangle-type 41 which is cheaper than the circle-type 40.

The skirt portion 52, and the receiving part 60, are formed so that the shielding cover 50 can be used in common in compressor assemblies having the circle-type overload protector 40 or the rectangle-type overload protector 41. Describing more in detail, the receiving part 60 includes a first receiving part or portion 61 which is formed in about a circle-shape for receiving the circle-type overload protector 40, and a second receiving part or portion 62 which receives the both sides 41a and 41b of the rectangle-type overload protector 41.

Especially, the second receiving part 62 includes a pair of guiding grooves 62a which are protruded symmetrically with each other in a radial direction from the side surface of the first receiving part 61 and extended in a longitudinal direction. Accordingly, the both sides 41a and 41b of the rectangle-type overload protector 41 are slidingly coupled in the guiding grooves 62a, respectively. Also, it is preferable that an inner diameter D1 of the first receiving part 61 is substantially the same as a diameter D2 of the circle-type overload protector 40, and a width W1 of the second receiving part 62 and a length L1 between two guiding grooves 62a are substantially the same as a width W2 and a length L2 of the rectangle-type overload protector 41, respectively.

In the meantime, it is preferable that the skirt portion 52 including the first and second receiving parts 61 and 62 is integrally formed with the upper surface 51, the contacting portion 53 and the drawing hole 54, in manufacturing the shielding cover 50 by an injection molding of plastics.

As a result, the circle-type overload protector 40 is received in the first receiving part 61, and the rectangle-type overload protector 41 is received in the guiding grooves 62a of the second receiving part 62, to thereby securely fix the overload protector 40 (or 41).

The assembling process and effect of the shielding cover will be described hereinafter.

Figure 3:
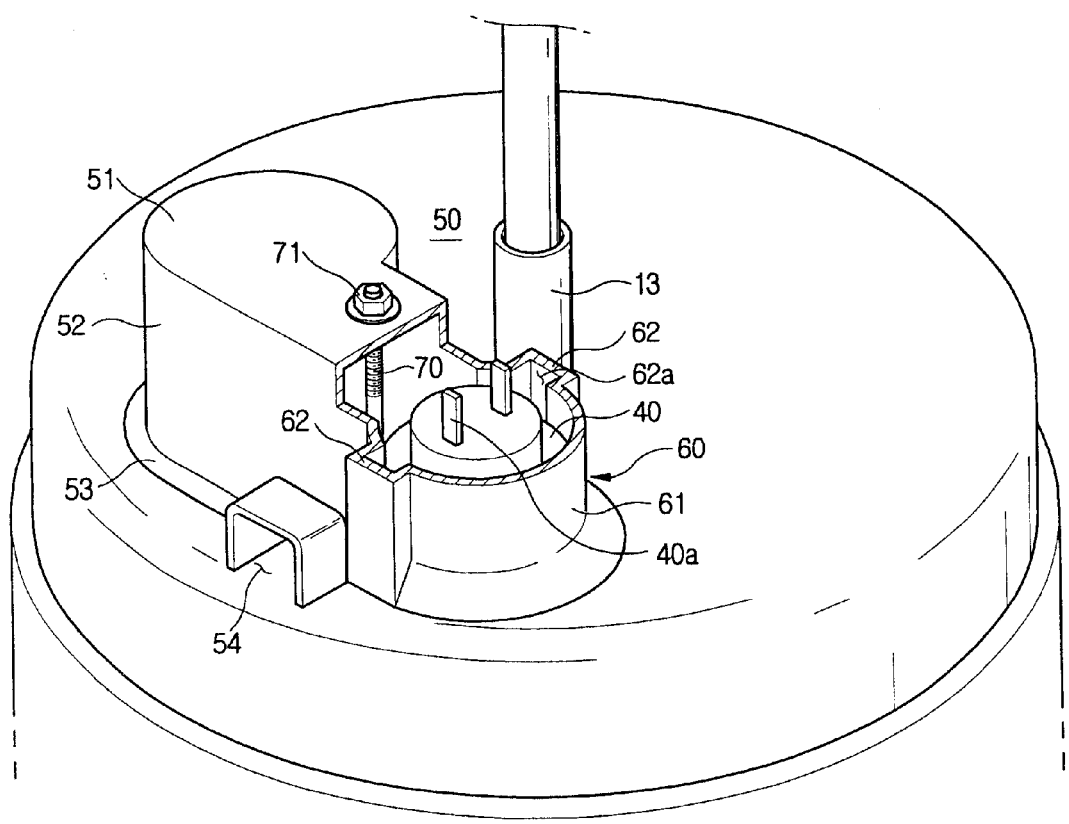
FIG. 3 is an enlarged perspective view showing a coupled state of a circle-type overload protector and a shielding cover depicted in FIG. 2.

First, the shielding cover 50 for covering the circle-type overload protector 40 is described with reference to FIGS. 2 and 3.

As shown in the drawings, when the circle-type overload protector 40 mounted on the upper surface of the airtight container 11 is covered with the shielding cover 50, the upper end of the stud bolt 70 is exposed via the through-hole 51a and the overload protector 40 is received tightly in the first receiving part 61.

In this state, a nut 71 is fastened to the upper end of the stud bolt 70, so that the contact portion 53 of the shielding cover 50 contacts closely with the upper surface of the airtight container 11 and the overload protector 40 is kept securely mounted. Therefore, the shielding cover 50 prevents foreign materials from contacting with the power input terminal 30 and the overload protector 40. As a result, the applied power is safely supplied to the driving motor inside the airtight container 11 via the overload protector 40 and the power input terminal 30, so the rotary compressor 10 can be stably operated.

Figure 5:
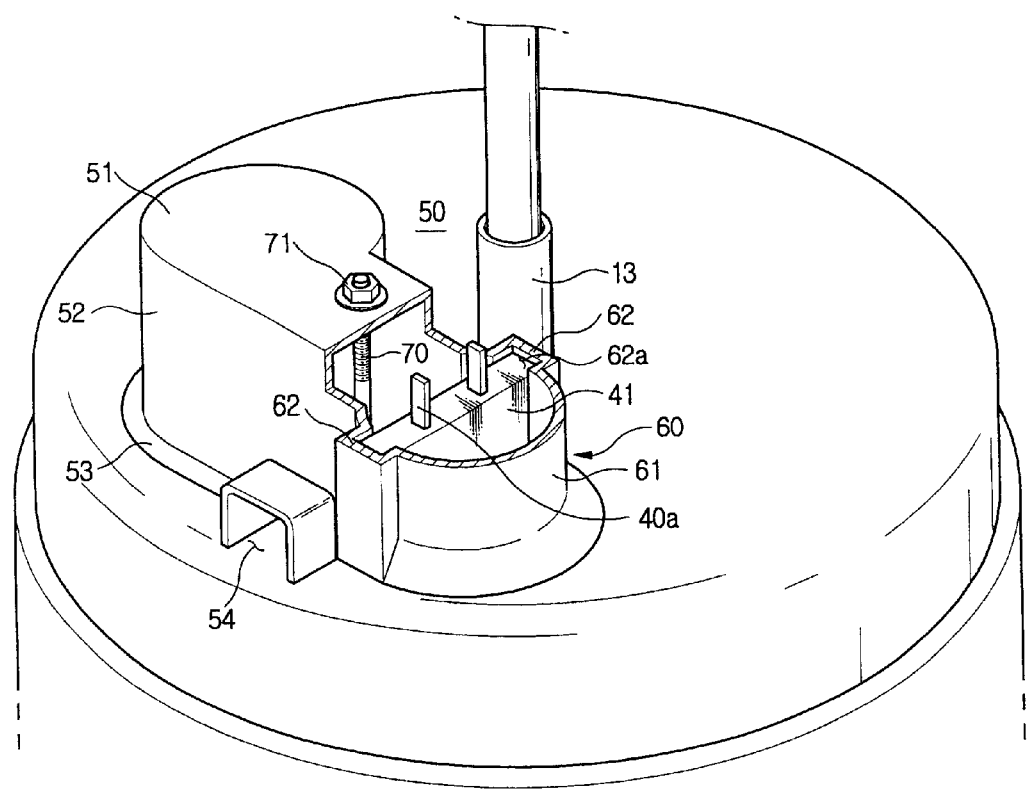
FIG. 5 is an enlarged perspective view showing a coupled state of a rectangle-type overload protector and a shielding cover depicted in FIG. 4.

Next, the shielding cover 50 for covering the rectangle-type overload protector 41 is described with reference to FIGS. 4 and 5.

As shown in the drawings, when the rectangle-type overload protector 41 mounted on the upper surface of the airtight container 11 is covered with the shielding cover 50, the upper end of the stud bolt 70 is exposed via the through-hole 51a and the both sides 41a and 41b of the overload protector 41 are received tightly in the guiding grooves 62a of the second receiving part 62.

In this state, a nut 71 is fastened to the upper end of the stud bolt 70, 50 that the contact portion 53 of the shielding cover 50 contacts closely with the upper surface of the airtight container 11 and the overload protector 41 is kept securely mounted, so that the rotary compressor 10 can be operated stably.

Although various embodiments of a rotary compressor assembly which incorporate the teachings of the present invention have been shown and described herein, the object of the present invention is readily achieved also when the present invention is applied to a shielding cover which is mounted in any electric appliance having a terminal device such as an overload protector.

As described above in detail, according to a shielding cover, for a terminal device of an electric appliance and a compressor assembly, of the present invention, first and second receiving parts which can receive selectively two or more terminal devices (overload protectors) formed in different shapes are integrally formed at a shielding cover. Accordingly, since the shielding cover can be used in common regardless of the shapes of the terminal devices, the whole manufacturing cost of an electric appliance such as a compressor assembly can be reduced.

What is claimed is:

1. A compressor assembly, comprising:
   a compressor;
   an overload protector for the compressor, said overload protector having a first shape or a second shape, said first shape of said overload protector being cylindrical and said second shape of said overload protector being rectangular; and
   a shielding cover for protecting the overload protector, the shielding cover comprising a receiving part for receiving the overload protector, with the receiving part including first and second receiving portions of corresponding first and second shapes, respectively, to selectively receive in corresponding ones of said first and second receiving portions the overload protector of said first shape or the overload protector of said second shape, the second receiving portion being formed by rectangular cavities extending diametrically outward from and inner surface of said first receiving portion for receiving opposing ends of the rectangular shaped overload protector.

2. The compressor assembly according to claim 1, further comprising:
   a power input terminal for the compressor, the power input terminal being positioned in spaced relation from the overload protector; and
   a second receiving part comprised in the shielding cover, said second receiving part protecting the power input terminal.

3. A shielding cover for protecting a terminal device of an electric appliance, the shielding cover comprising:
   a receiving part for receiving the terminal device, said receiving part including a first receiving portion having a first shape for receiving said terminal device when said terminal device has a corresponding first shape, and a second receiving portion having a second shape for receiving said terminal device when said terminal device has a corresponding second shape, said first receiving portion receiving a substantially cylindrical shaped terminal device and said second receiving portion receiving a rectangular shared terminal device and said second receiving portion being formed by rectangular cavities extending diametrically outward from an inner surface of the first receiving portion for receiving opposing ends of the rectangular shaped terminal device.

4. The shielding cover for a terminal device of an electric appliance according to claim 3, further comprised of the terminal device comprising an overload protector.

5. An electric appliance, comprising:
   a terminal device for the electric appliance, said terminal device having a first shape or a second shape; and
   a shielding cover for protecting the terminal device, the shielding cover comprising a receiving part for receiving the terminal device, with the receiving part including first and second receiving portions of corresponding first and second shapes, respectively, to selectively receive in corresponding ones of said first and second receiving portions the terminal device of said first shape or the terminal device of said second shape, wherein said first receiving portion receiving a substantially circular shared terminal device and said second receiving portion receiving a rectangular shaped terminal device and said second receiving portion being formed by rectangular cavities extending diametrically outward from an inner surface of the first receiving portion for receiving opposing ends of the rectangular shared terminal device.

6. The electrical appliance according to claim 5, further comprised of the terminal device comprising an overload protector.

7. The electrical appliance according to claim 5, said substantially circular shaped terminal device being comprised of a lower portion and an upper portion, said lower portion having a diameter larger than said upper portion.

8. The electrical appliance according to claim 5, said substantially circular shaped terminal device being comprised of a lower disk shaped portion and an upper disk shaped portion, said lower disk shaped portion having a diameter larger than said upper disk shaped portion.

9. The electrical appliance according to claim 7, said lower portion and said upper portion of said terminal device each being cylindrically shaped.

* * * * *